(12) United States Patent
Shimada

(10) Patent No.: US 6,557,112 B1
(45) Date of Patent: Apr. 29, 2003

(54) QOS PROTECTION SYSTEM

(75) Inventor: Naohiro Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/455,236

(22) Filed: Dec. 6, 1999

(30) Foreign Application Priority Data

Dec. 9, 1998 (JP) ............................................. 10-349220

(51) Int. Cl.[7] .............................. H02H 3/05; H04L 1/00; G06F 11/00
(52) U.S. Cl. ............................ 714/4; 370/222; 370/244; 370/248; 370/250
(58) Field of Search ........................... 714/4; 370/230.1, 370/395.1, 395.21, 395.4, 395.42, 222, 231, 232, 235, 233, 234, 248, 244, 250, 252, 253; 709/223–226

(56) References Cited

U.S. PATENT DOCUMENTS

| | | | | |
|---|---|---|---|---|
| 5,150,356 A | * | 9/1992 | Tsutsui ........................ | 370/223 |
| 5,485,465 A | * | 1/1996 | Liu et al. ...................... | 370/218 |
| 5,485,576 A | * | 1/1996 | Fee et al. ..................... | 370/228 |
| 5,519,689 A | * | 5/1996 | Kim ............................. | 370/232 |
| 5,684,958 A | * | 11/1997 | Adachi et al. ............... | 370/218 |
| 5,796,720 A | * | 8/1998 | Yoshida et al. .............. | 370/245 |
| 5,854,783 A | * | 12/1998 | Kaganoi ....................... | 370/232 |
| 6,006,270 A | * | 12/1999 | Kobunaya .................... | 709/233 |
| 6,154,448 A | * | 11/2000 | Petersen et al. ............. | 370/216 |
| 6,195,336 B1 | * | 2/2001 | Stumer ......................... | 370/238 |
| 6,269,452 B1 | * | 7/2001 | Daruwalla et al. ........... | 370/222 |

FOREIGN PATENT DOCUMENTS

| | | |
|---|---|---|
| DE | 25 43 472 C2 | 11/1976 |
| DE | 196 05 873 A1 | 8/1997 |
| EP | 0 225 643 A2 | 6/1987 |
| EP | 0 944 289 A2 | 9/1999 |
| JP | 62-137929 | 7/1987 |
| JP | 7-170276 | 7/1995 |
| JP | 8-251184 | 9/1996 |
| JP | 8-265323 | 10/1996 |
| JP | 9-162870 | 6/1997 |
| JP | 10-173657 | 6/1998 |
| JP | 10-257079 | 9/1998 |
| JP | 11-331262 | 11/1999 |
| JP | 2000-101577 | 4/2000 |

OTHER PUBLICATIONS

Japanese Office Action dated Jul. 30, 2002.
"Computer–Netzwerke," Andrew S. Tanenbaum, Wolframs Fachbuchverlag, 1990, pp. 245, 256.

* cited by examiner

Primary Examiner—Robert Beausoliel
Assistant Examiner—Yolanda L. Wilson
(74) Attorney, Agent, or Firm—Scully, Scott, Murphy & Presser

(57) ABSTRACT

A QOS protection system can switch a current system and a reserved system depending upon degradation of quality through monitoring of arriving condition of packet to perform transmission with guarantee of QOS. The QOS protection system in a redundant system includes detection means for monitoring the packet flow and detecting at least the quality of degradation of the packet flow and switching means for performing switching between the current system and the reserved system when the detection means detects degradation of quality.

11 Claims, 9 Drawing Sheets

QOS PROTECTION SYSTEM

BACKGROUND OF THE INVENTION

1. Field of the Invention

The present invention relates generally to a QOS protection system. More particularly, the invention relates to a recovering method of a packet in a bi-directional real time television conference system, for recovering the packet from a failure, such as late arrival or so forth.

2. Description of the Related Art

In the recent years, demand for applications requiring real time transmission, such as a bi-directional real time television conference system, has been growing significantly. This means that systems requiring detection of "late arrival", "packet loss", "packet error" at a packet level, "variation of late arrival" and recovering from those failure.

Conventionally, as a recovering method from the failure, there has been an established method for detecting a failure, such as signal interruption or error in a section, a line or a bus with taking the resultant value as a trigger for switching.

Here, as a cause of "late arrival" of the packet, it has been considered (1) a period required for transmission through all physical links and a period required in each node and (2) a period to be placed in waiting state upon congestion of the packet. (1) is determined in straightforward depending upon the network. On the other hand, (2) is a cause of "variation of late arrival" and is variable depending upon variation of congestion at each node.

On the other hand, as a cause of "packet loss" is (1) "packet error" due to line error or so forth and error correction is not possible, or (2) disposal of an ATM (Asynchronous Transfer Mode) cell due to violation of UPC (Usage Parameter Control) or NPC (Network Parameter Control).

However, in connection with the packet delay or packet variation, there has not been developed or proposed a method to detect the packet delay or the variation of the delay for switching a current system and a reserved system with taking detection as trigger.

In the above-mentioned conventional recovering method for the packet from failure, at first, the detection of the packet delay and the variation of the delay period to take the detection as trigger for switching between the current system and the reserved system is not considered. Therefore, there is not such particular method effective for the packet delay and the variation of the packet delay, and thus can recover quality at the packet level. This problem is critical.

Namely, despite of the fact that it has been necessary to monitor arriving condition of the healthy packet for detecting "late arrival", "packet loss", "packet error", "variation of late arrival" at packet level not causing complete failure, in addition to the failure of signal interruption, transmission error and so forth which has been monitored conventionally, to regard degradation of quality as failure to perform switching.

SUMMARY OF THE INVENTION

Therefore, the present invention has been worked out for solving the problem in the prior art set forth above. It is an object of the present invention to provide a QOS 'Quality of Service' protection which monitors the arriving condition of packets for switching between a current system and a reserved system depending upon degradation of quality to guarantee QOS.

According to one aspect of the present invention, a QOS protection system in a redundant system including a current system and a reserved system for monitoring packet flow for detecting at least one defect information among section, line and path and recovering the defect, comprises:

detection means for monitoring the packet flow and detecting at least the quality of degradation of the packet flow; and switching means for performing switching between the current system and the reserved system when the detection means detects degradation of quality.

The QOS protection system takes not only section or line, such as loss of signal and transmission but also defect information of path and "loss of packet" or "packet error" or "late arrival" or "packet variation" as trigger for initiating operation of own system and whereby to trigger protection.

For application requiring real time transmission, not only defect, such as loss of signal, transmission error or so forth but also degradation of quality are monitored for switching the current system and the reserved system for guarantee QOS.

More particularly, in order to effect switching by detecting defect or degradation of input packet flow, the packet in the packet flow is input to a defect detection in a QOS protection function portion.

The defect detection portion includes the path defect detection portion for detecting defect in section, line or path and the packet defect detection portion for proving switching command for switching between the current system and the reserved system for the switching portion when defect of degradation is detected by these detection portions.

By this, since "late arrival", "loss of packet", "packet error" and "packet variation" can be detected, it becomes possible to switch between the current system and the reserved system depending upon degradation of quality by monitoring the arriving condition of the packet to permit transmission with guarantee of QOS. This is quite effective for the application requiring real time transmission.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the Drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
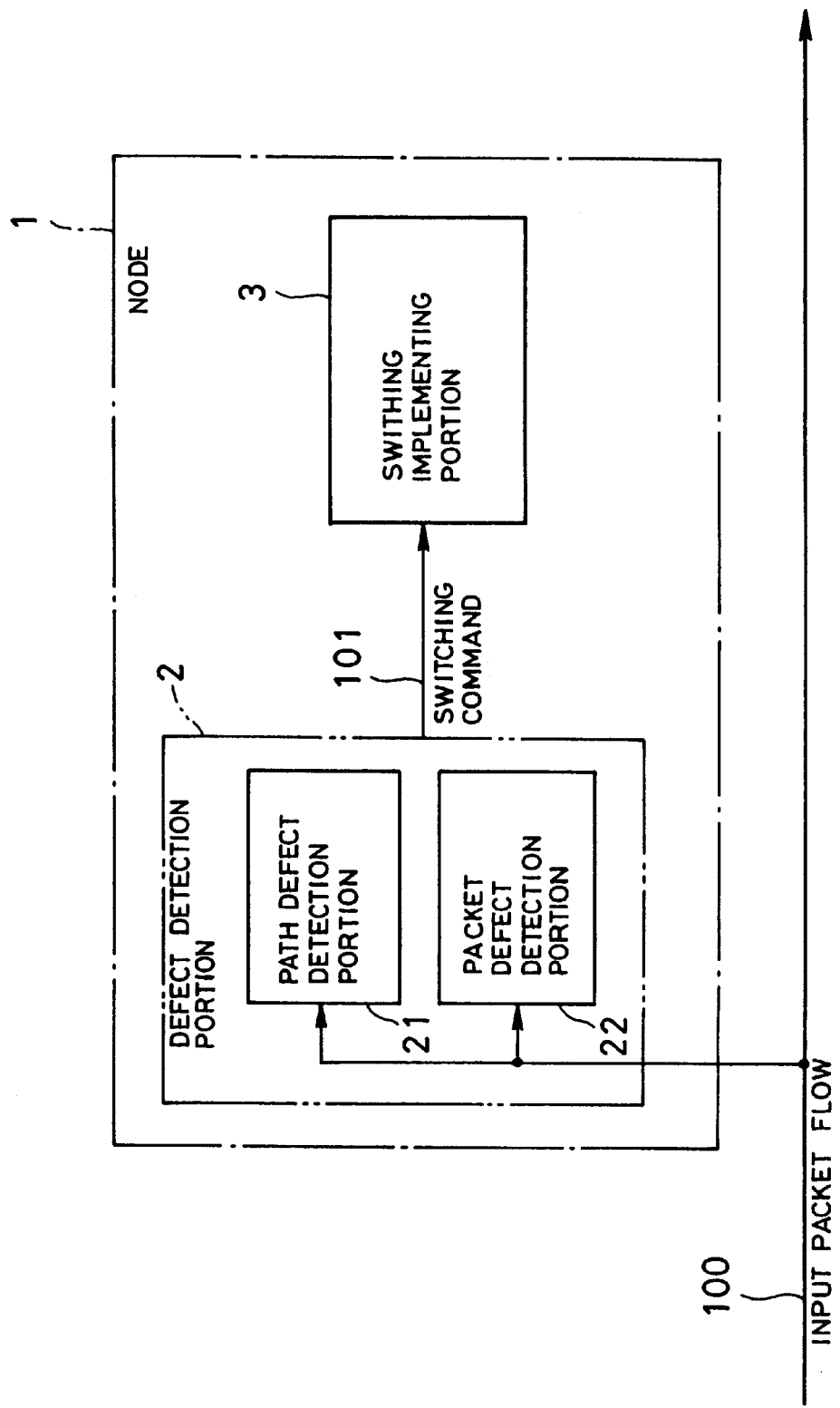
FIG. 1 is a block diagram showing a construction of one embodiment of a QOS protection function portion of the present invention.

FIG. 1 is a block diagram showing a construction of one embodiment of a QOS protection function portion of the present invention. In FIG. 1, a QOS protection function portion (not shown) including a defect detection portion 2 and a switching implementing portion 3, is provided in a node 1.

The defect detection portion 2 is constituted of a path level defect detection portion 21 and a packet level defect detection portion 22.

The path level defect detection portion 21 detects section or line, or a defect of a path from an input packet flow 100. The packet level defect detection portion 22 detects defect of the packet from the input packet flow 100.

The defect detection portion 2 outputs a switching command 101 to the switching implementing portion 3 when failure or degradation which will be generally referred to as defect, in the path level defect detection portion 21 or the packet level defect detection portion 22 for switching between a current system (not shown) and a reserved system (not shown) by the switching implementing portion 3. Here, the path level defect detection portion 21 performs only path detection.

Figure 2:
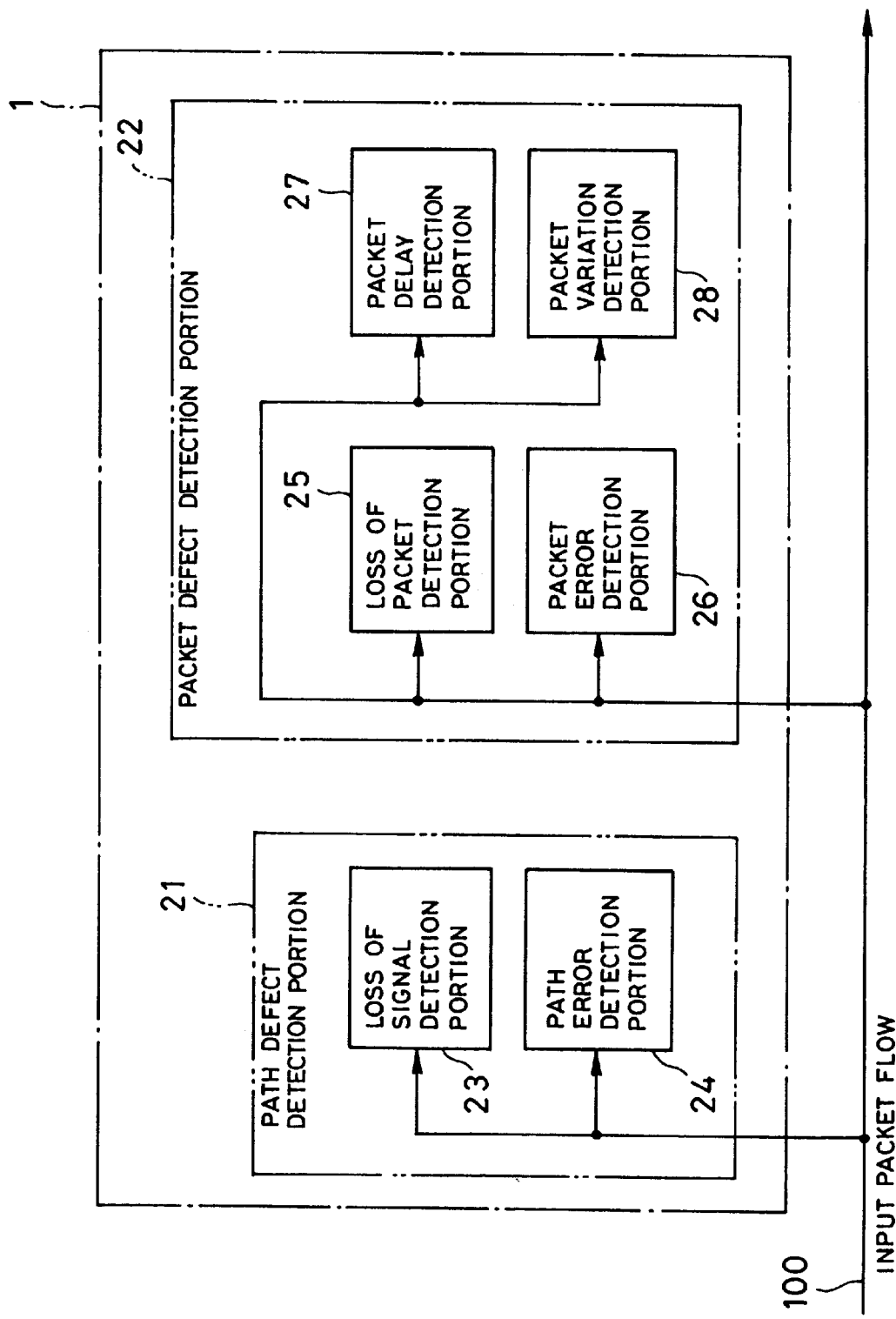
FIG. 2 is a block diagram showing a detailed construction of a path level detecting portion and a packet level detecting portion in FIG. 1.

FIG. 2 is a block diagram showing a detailed construction of the path level defect detection portion 21 and the packet level defect detection portion 22 of FIG. 1. In FIG. 2, the path level defect detection portion 21 includes a loss of signal detection portion 23 and a path error detection portion 24.

The packet level defect detection portion 22 includes a loss of packet detection portion 25, a packet error detection portion 26, a packet delay detection portion 27 and a packet variation detection portion 28.

The loss of signal detection portion 23 detects loss of signal from the input packet flow 100. The path error detection portion 24 detects path error from the input packet flow 100.

The loss of packet detection portion 25 detects loss of packet from the input packet flow 100. The packet error detection portion 26 detects packet error from the input packet flow 100.

On the other hand, the packet delay detection portion 27 detects packet delay from the input packet flow 100. The packet variation detection portion 28 detects packet variation from the input packet flow 100.

Figure 3:
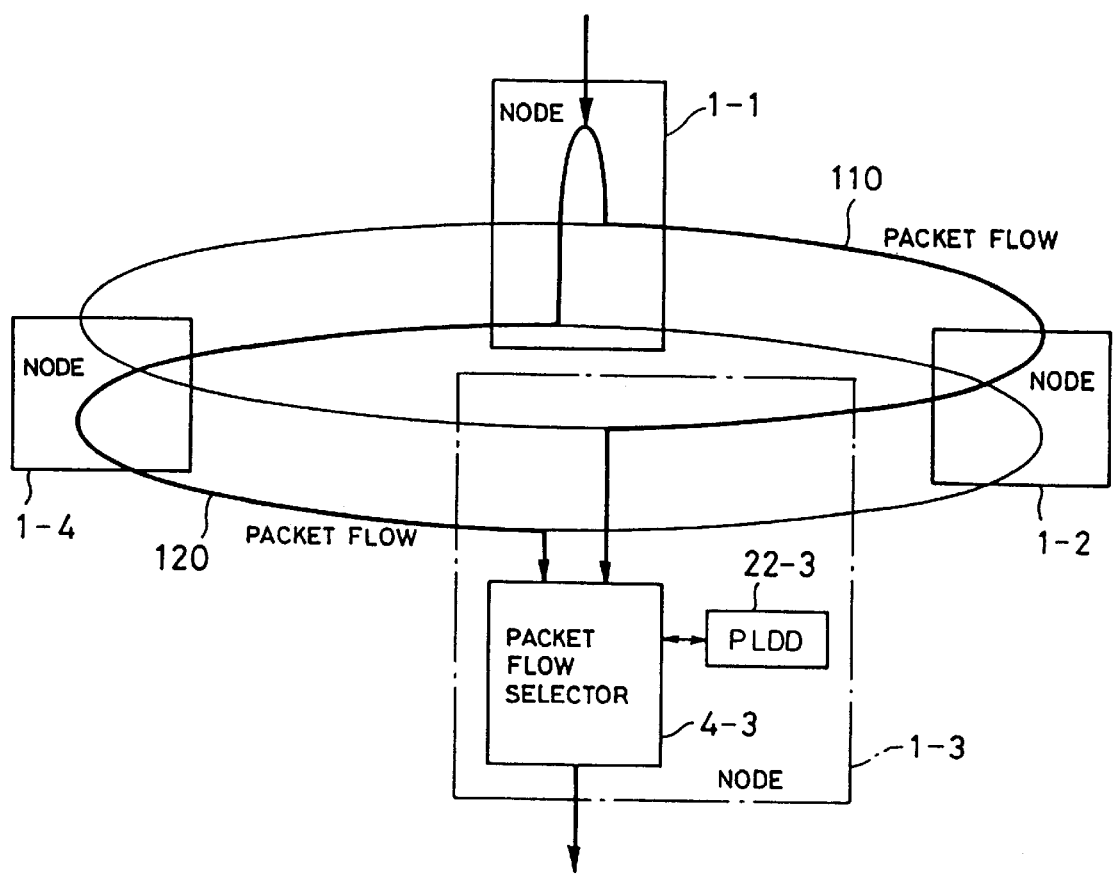
FIG. 3 is a block diagram showing a system construction employing one embodiment of the QOS protection function portion according to the present invention.

FIG. 3 is a block diagram showing a construction of the system employing one embodiment of a QOS system protection function portion according to the present invention. In FIG. 3, there is illustrated "1+1 protection", in which a packet is transmitted from a node (sender terminal) 1-1 to a node (receiver terminal) 1-3 through different paths, namely through node 1-2 (packet flow 110) and through a node 1-4 (packet flow 120).

The node 1-3 as the receiver terminal compares two inputs of the packet flows 110 and 120. If a packet level defect detector (PLDD) 22-3 makes judgment that the packet flow of the current system (packet flow 110) is degraded in comparison with the packet flow of the reserved system (packet flow 120), a packet flow selector (2-to-1 packet flow selector) 4-3 performs switching of the packet flow (between the current system and the reserved system).

Thus, in case of a method of "1+1 protections", identical signal should be transmitted to respective inputs of the current system and the reserved system through different path. Accordingly, by comparing two packet flows 110 and 120 at the node 1-3 as the receiver terminal as destination, packet defect can be easily judged and the current system and the reserved system can be switched.

Figure 4:
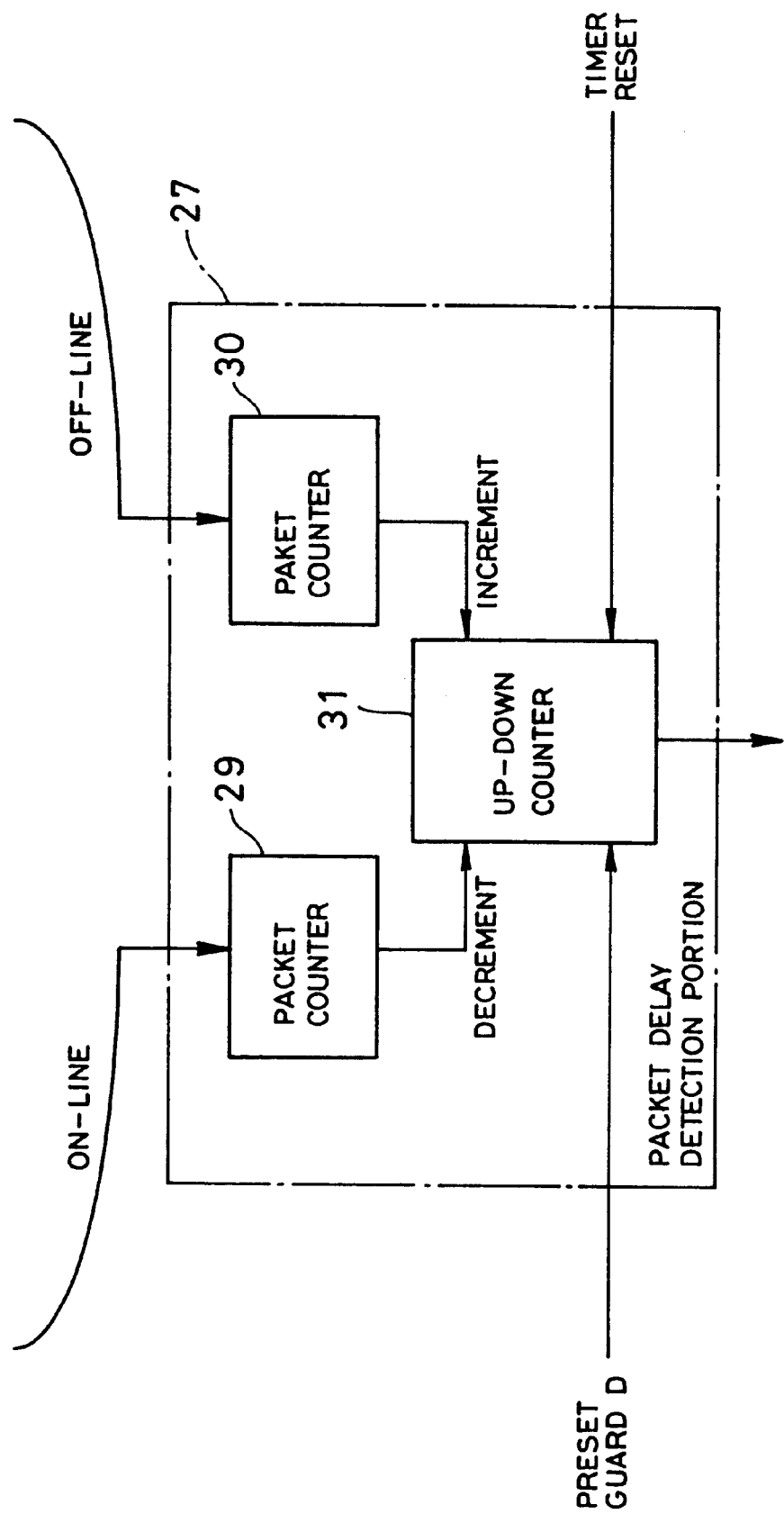
FIG. 4 is a block diagram showing a detailed construction of a packet late arrival detecting portion of FIG. 2.

FIG. 4 is a block diagram showing a detailed construction of the packet delay detection portion 27. In FIG. 4, the packet delay detection portion 27 includes a packet counters 29 and 30 and an up-down counter 31.

The packet counter 29 is connected to the current system (ON-line) to decrement the up-down counter 31 at every input of the packet from the current system. The packet counter 30 is connected to the reserved system (OFF-line) to increment the up-down counter 31 at every input of the packet from the reserved system.

The up-down counter 31 is decremented and incremented by the outputs of the packet counters 29 and 30 and makes judgment whether a counted value therein is greater than a preset guard D at every input of a timer reset which is input at every given time interval. If judgment is made that the counted value is greater than the preset guard D, the up-down counter 31 sends a switching command to the packet flow selector 4-3.

Figure 5:
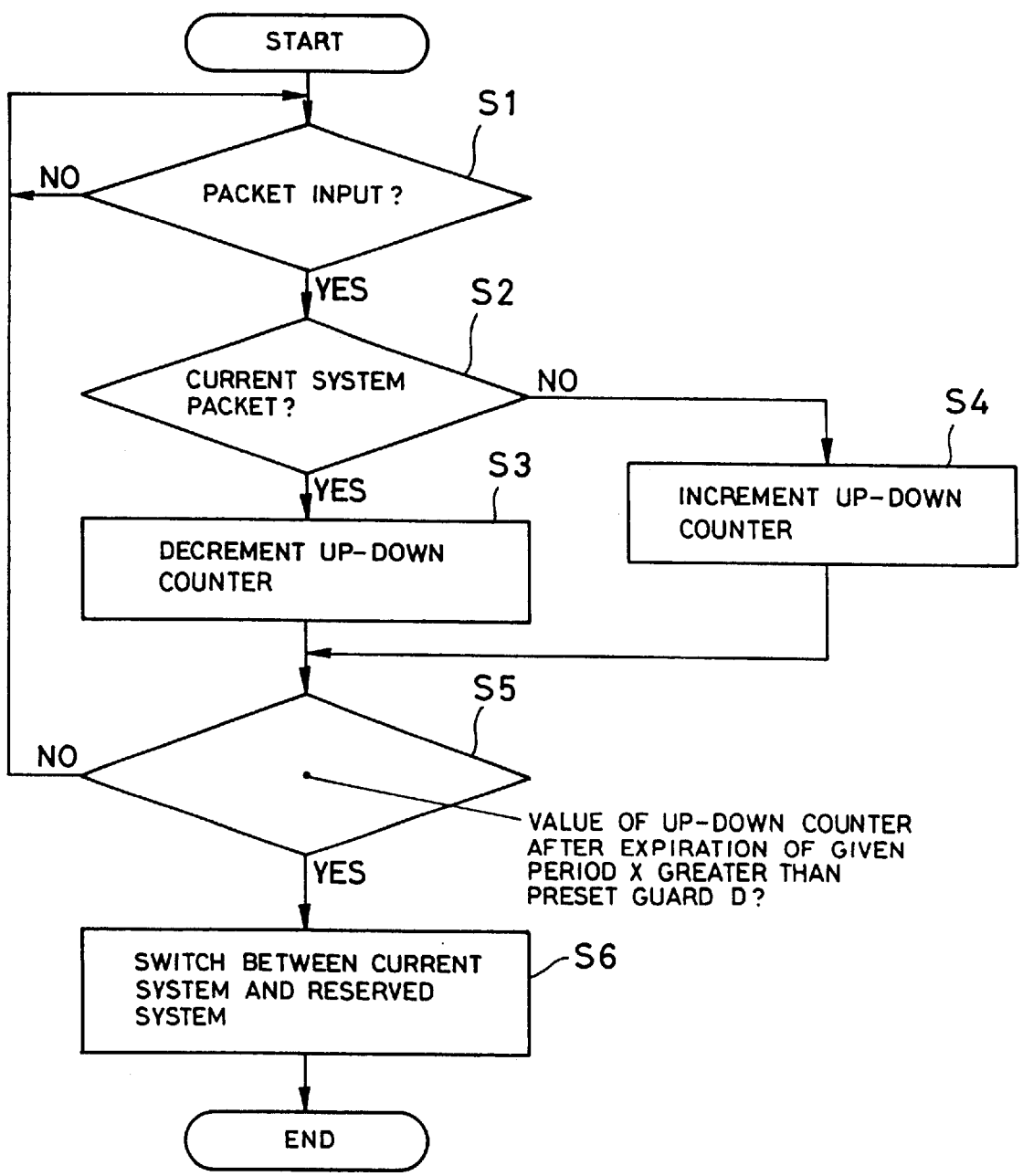
FIG. 5 is a flowchart showing a process operation of the packet late arrival detecting portion of FIG. 4.

FIG. 5 is a flowchart showing a process operation of the packet delay detection portion 27 of FIG. 4. Detection of degradation of the packet flow and switching of the current system and the reserved system will be discussed with reference to FIGS. 4 and 5, particularly.

The packet delay detection portion 27 counts number of packets input from respective paths of the current system and the reserved system for a given period and compares the results of counting for detecting degradation due to "late arrival" and degradation due to "loss of packet" and "packet error".

At this time, if the counted value of the reserved system is greater than the counted value of the current system to the extent that it is greater than or equal to the preset guard D which is preliminarily set as a guard, it can be regarded that packet delay is caused, the packet is not recognized due to error or loss of packet occurs, in the current system. Accordingly, the current system and the reserved system can be switched, taking the packet delay detection as a trigger.

The up-down counter 31 of the packet delay detection portion 27 is responsive to input of the packet (step S1 of FIG. 5), to check if the input packet is the packet of the current system or not (step S2 of FIG. 5). If the input packet is judged as the packet of the current system at step S2, the up-down counter 31 is decremented by the output of the packet counter 29 (step S3 of FIG. 5).

On the other hand, if the input packet is the packet of the reserved system as checked at step S2 of FIG. 5, the up-down counter 31 is incremented by the output of the packet counter 30 (step S4 of FIG. 5).

The packet delay detection circuit 27 checks if the counted value of the up-down counter 31 after expiration of the given period X is greater than or equal to the preset guard D or not (step S5 of FIG. 5). If the counted value of the up-down counter 31 is greater than the preset guard D, the switching command is issued to the packet flow selector in order to perform switching between the current system and the reserved system at the current timing.

Figure 6:
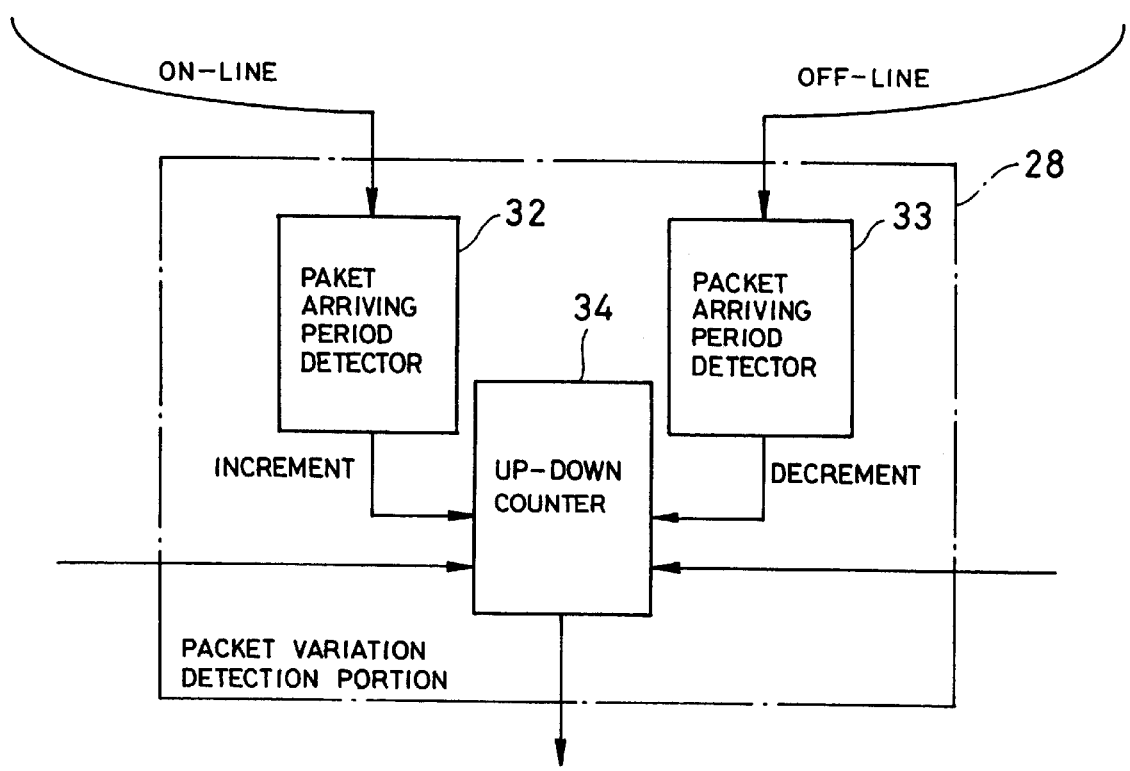
FIG. 6 is a block diagram showing a detailed construction of a packet later arrival variation detecting portion of FIG. 2.

FIG. 6 is a block diagram showing a detailed construction of the packet variation detection portion 28 of FIG. 2. In FIG. 6, the packet variation detection portion 28 includes packet arriving period detectors 32 and 33 and an up-down counter 34.

The packet arriving period detector 32 is connected to the current system (ON-line) for rounding a scheduled packet arriving period and an actual packet arriving period into integers at every input of the packet from the current system, and integrates a difference therebetween for incrementing the up-down counter 34 with an integrated value.

The packet arriving period detector 33 is connected to the reserved system (OFF-line) for rounding a scheduled packet arriving period and an actual packet arriving period into integers at every input of the packet from the reserved system, and integrates a difference therebetween for decrementing the up-down counter 34 with an integrated value.

The up-down counter 34 is incremented and decremented by the outputs of the packet arriving period detectors 32 and 33 and makes judgment whether the counted value is greater than a preset guard J at every input of a timer reset which is input at every given time interval. If the counted value is judged as being greater than the preset guard J, the up-down counter 34 issues a switching command to the packet flow selector 4-3.

Figure 7:
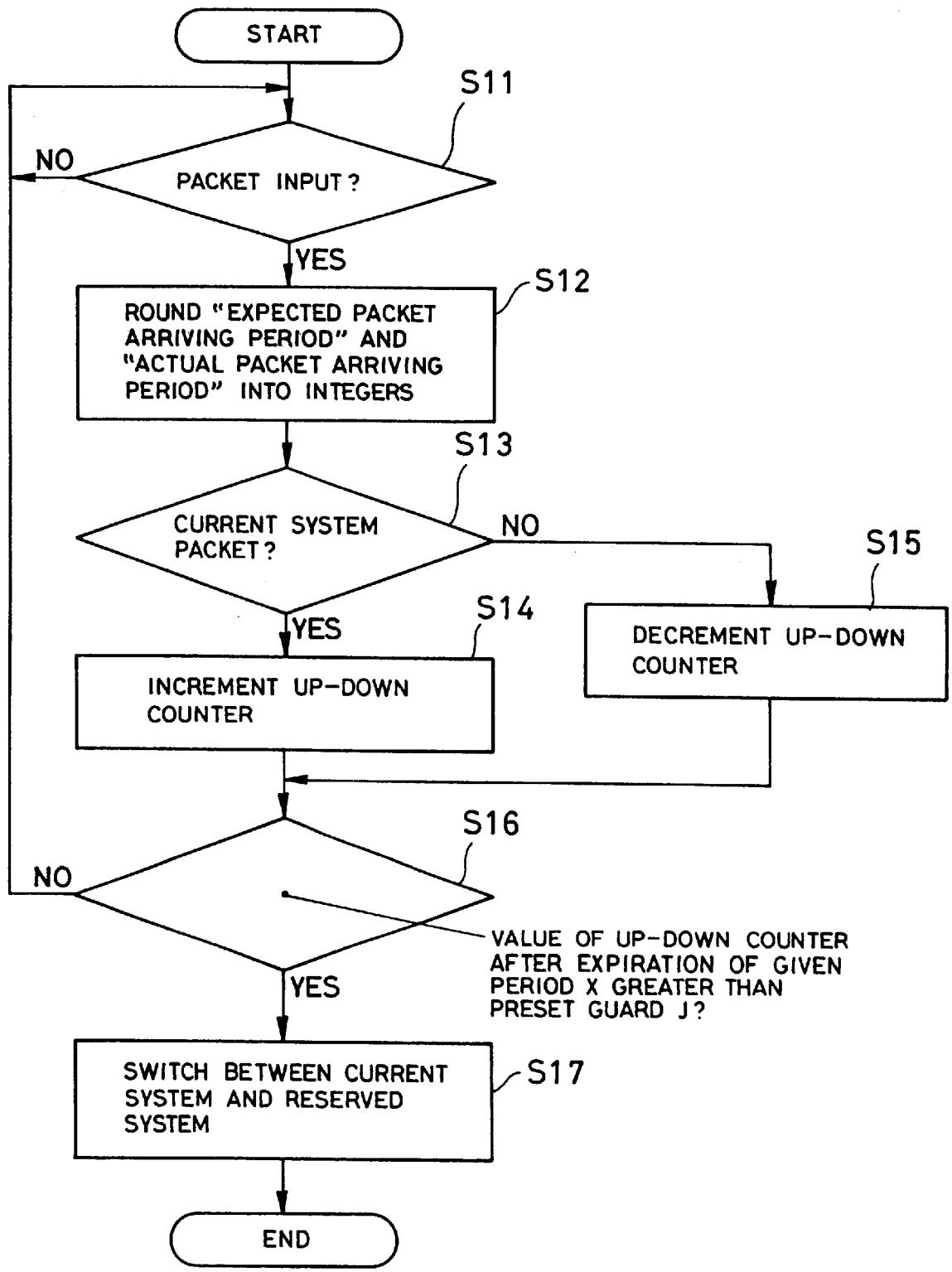
FIG. 7 is a flowchart showing a process operation of the packet late arrival variation detecting portion of FIG. 6.

FIG. 7 is a flowchart showing a process operation of the packet variation detection portion 28 of FIG. 6. Practical operation in defect detection and switching between the current system and the reserved system of the packet variation detection portion 28 will be discussed with reference to FIGS. 6 and 7.

If the packet is transmitted at a constant interval, a degree of packet variation can be derived by storing an average arriving period of past n packets and comparing an expected packet arriving period which may be derived from the stored average packet arriving period, and an actual packet arriving period as an integrated value of a difference between the expected packet arriving period and the actual packet arriving period. If the degree of packet variation is greater than the preset guard J which is preliminarily set as a guard, it can be regarded that the current system causes variation of the packet flow to cause switching between the current system and the reserved system with taking the foregoing detection as trigger.

Upon performing comparison between a difference between the expected packet arriving period and the actual packet arriving period of the current system and a difference between the expected packet arriving period and the actual packet arriving period of the reserved system, the packet variation detecting portion 28 uses the up-down counter 34 as set forth above. In this case, the up-down counter 34 derives difference in respective of the current system and the reserved system and is incremented by the difference of the current system and decremented by the difference of the reserved system.

The packet variation detection portion 28 is responsive to input of the packet (step S11 of FIG. 7). Then, the packet arriving period detectors 32 and 33 round the "expected packet arriving period" [ns] and the "actual packet arriving period [ns] into integers (step S12 of FIG. 7) to integrate the difference therebetween.

If the input packet is the packet of the current system (step S13 of FIG. 7), the up-down counter 34 is incremented by the output (integrated value) of the packet arriving period detector 32 (step S14 of FIG. 7).

If the input packet is the packet of the reserved system (step S13 of FIG. 7), the up-down counter 34 is decremented by the output (integrated value) of the packet arriving period detector 32 (step S15 of FIG. 7).

The packet variation detection portion 28 checks the counted value after expiration of a given period X whether it is greater than the preset guard J (step S16 of FIG. 7), If the counted value as checked at step S16 is greater than the preset guard J, the packet variation detection portion 28 issues a switching command to the packet flow selector in order to perform switching between the current system and the reserved system at the current timing (step S17 of FIG. 7).

As set forth above, since one embodiment of the QOS protection function portion detects "late arrival", "loss of packet", "packet error" and "packet variation", it becomes possible to effect switching between the current system and the reserved system depending upon degradation of quality according to a result of monitoring of the arriving condition of the packets. Therefore, transmission with guarantee of QOS can be performed. Thus, the QOS protection function portion of the present invention is quite effective for application requiring real time transmission.

On the other hand, when the method of "1+1 protection" in one embodiment of the QOS protection function portion according to the present invention, the identical signal should be transmitted to respective inputs of the current system and the reserved system through different paths. Accordingly, the quality of the current system and the quality of the reserved system can be easily compared by the node 1-3 as receiver terminal. At this time, between switching the current system and the reserved system, it is not necessary to again confirm that the quality of the reserved system is higher than that of the current system.

Furthermore, one embodiment of the QOS protection function portion according to the present invention performs speed up of the switching between the current system and the reserved system by means of using the packet flow selector 4-3 (2 to 1 selector) as the method of "1+1 protection". Also, it becomes possible to down sizing and cost down of a terminal performing switching of the current system and the reserved system.

Furthermore, one embodiment of the QOS protection function portion according to the present invention performs comparison of the quality of the current system and the quality of the reserved system at the node 1-3 as the receiver terminal using the up-down counters 31 and 34 in the packet delay detection portion 27 and the packet variation detection portion 28. Thus, simplification and speeding up of comparing operation can be achieved. Also, it becomes possible to down sizing and cost down of a terminal performing switching of the current system and the reserved system.

It should be noted that the foregoing embodiment has been discussed under a premise that the "1+1 protection" method is used and does not check identity of the individual packets. In this sense, it may considered a method to check identity of the individual packets. In such method, addition of the unnecessary packet may be checked.

Figure 8:
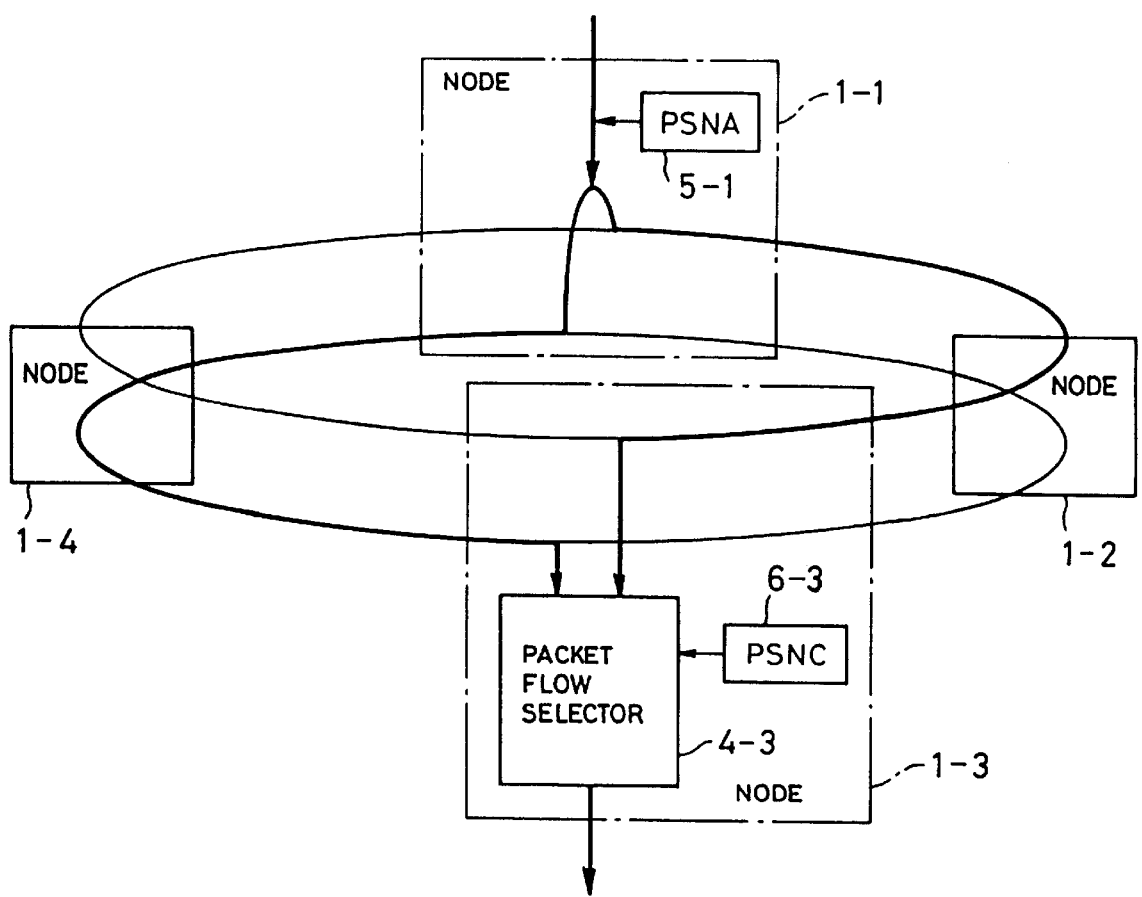
FIG. 8 is a block diagram showing a system construction employing another embodiment of the QOS protection function portion according to the present invention.

FIG. 8 is a block diagram showing a construction of the system employing another embodiment of the QOS protection function portion according to the present invention. In FIG. 8, there is shown a method, in which a serial number is added for each packet to be transmitted by a packet serial number adder (PSNA) 5-1 in the node 1-1 as the sender terminal, and in which the serial numbers added to respective packets of the current system and the reserved system are compared in the packet serial number comparater (PSNC) 6-3 in the node 1-3 as the receiver terminal.

Figure 9:
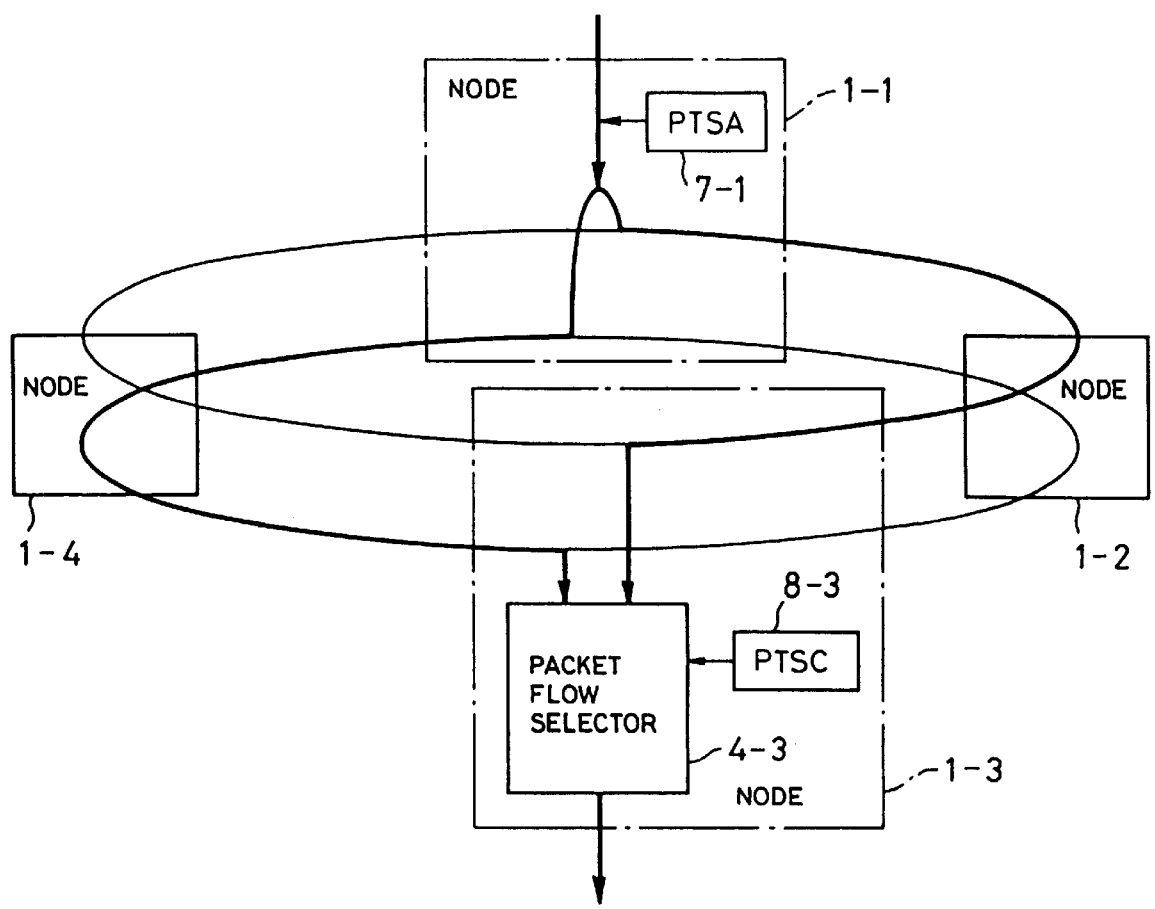
FIG. 9 is a block diagram showing a system construction employing a further embodiment of the QOS protection function portion according to the present invention.

FIG. 9 is a block diagram showing a construction of he system employing another embodiment of the QOS protection function portion according to the present invention. In FIG. 9, there is shown a method, in which a time stamp is added for each packet to be transmitted by a packet time stamp adder (PTSA) 7-1 in the node 1-1 as the sender terminal, and in which the time stamps added to respective packets of the current system and the reserved system are compared in the packet time stamp comparator (PTSC) 8-3 in the node 1-3 as the receiver terminal.

On the other hand, apart from the former embodiments of the present invention, the foregoing method is applicable even for three or more inputs. Namely, not only for comparing two inputs of the current system and the reserved system, but also for a network having three or more inputs for comparison of a plurality of current systems and one reserved system or for comparison of one current system and a plurality of reserved systems, the foregoing method is applicable.

The foregoing method is basically a method to determine which is superior in comparison of the current system and the reserved system. In addition to the detection of relative superiority employing the method set forth above, it is possible to perform absolute defect detection. Namely, by preliminarily setting levels to be regarded as defect for "late arrival", "loss of packet", "packet error" and "packet variation" for effecting checking of the quality of the current system against those preliminarily set criteria levels for switching into the reserved system.

In such case, it becomes necessary to effect switching after confirmation that the quality of the reserved system is higher than the quality of the current system. Namely, by sending a checking packet to the reserved system to at least check the condition of the reserved system in comparison with the current system in advance of switching. The method to simultaneously perform verification set forth above by the packet flow is the "1+1 protection" method set forth above.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A QOS protection system in a redundant system including a current system and a reserved system for monitoring packet flow to detect at least one defect among section, line and path and recovering from the defect, said QOS protection system comprising:

detection means for monitoring said packet flow and detecting at least the quality of degradation of said packet flow, said detection means comprising packet defect detection means for counting number of packets input through respective paths of said current system and said reserved system, comparing the results of counting to detect degradation due to late arrival, loss of packet and packet error, and outputting a switching command when degradation of said packet flow is detected; and switching means for performing switching according to said output switching command between said current system and said reserved system when said detection means detects degradation of quality of said packet flow.

2. A QOS protection system as set forth in claim 1, wherein said detection means detects at least one of loss of packet, packet error, packet delay and packet variation to be caused in packet and cell level by monitoring packet flow.

3. A QOS protection system as set forth in claim 1, wherein said detection means comprises:

path defect detection means for detecting defect of at least one of said section, line and path; and said packet defect detection means further for applying said switching command to said switching means when one of defect or degradation is detected by said path defect detection means and said packet defect detection means.

4. A QOS protection system as set forth in claim 3, wherein said path defect detection means comprises:

a loss of signal detection portion for detecting loss of signal from an input packet flow; and a packet error detection portion for detecting packet error from said input packet flow.

5. A QOS protection system as set forth in claim 1, wherein the identical signal is fed to respective paths of said current system and said reserved system.

6. A QOS protection system in a redundant system including a current system and a reserved system for monitoring packet flow to detect at least one defect among section, line and path and recovering from the defect, said QOS protection system comprising:

detection means for monitoring said packet flow and detecting at least the quality of degradation of said packet flow, said detection means comprising packet defect detection means for comparing a difference between an expected packet arriving period and an actual packet arriving period in said current system and a difference between an expected packet arriving period and an actual packet arriving period in said reserved system, to detect packet variation in said packet flow, and outputting a switching command when degradation of said packet flow is detected; and switching means for performing switching according to said output switching command between said current system and said reserved system when said detection means detects degradation of quality of said packet flow.

7. A QOS protection system in a redundant system including a current system and a reserved system for monitoring packet flow to detect at least one defect among section, line and path and recovering from the defect, said QOS protection system comprising:

detection means for monitoring said packet flow and detecting at least the quality of degradation of said packet flow, said detection means adding a serial number for respective packet to be transmitted on a transmission side, comparing the serial number added for respective packets of said current system and said reserved system on a reception side for detecting degradation of quality, and outputting a switching command when degradation of said packet flow is detected; and switching means for performing switching according to said output switching command between said current system and said reserved system when said detection means detects degradation of quality of said packet flow.

8. A QOS protection system in a redundant system including a current system and a reserved system for monitoring packet flow to detect at least one defect among section, line and path and recovering from the defect, said QOS protection system comprising:

detection means for monitoring said packet flow and detecting at least the quality of degradation of said packet flow, said detection means adding a time information for respective packet to be transmitted on a transmission side, comparing the time information added for respective packets of said current system and said reserved system on a reception side for detecting degradation of quality, and outputting a switching command when degradation of said packet flow is detected; and switching means for performing switching according to said output switching command between said current system and said reserved system when said detection means detects degradation of quality of said packet flow.

9. A QOS protection system in a redundant system including a current system and a reserved system for monitoring packet flow to detect at least one defect among section, line and path and recovering from the defect, said QOS protection system comprising:

detection means for monitoring said packet flow and detecting at least the quality of degradation of said packet flow, said detection means comprising packet defect detection means that comprises a loss of packet detection portion for detecting loss of packet from an input packet flow, a packet error detection portion for detecting packet error from said input packet flow, a packet delay detection portion for detecting packet delay from said input packet flow, and a packet variation detection portion for detecting packet variation from said input packet flow, said packet defect detection means further outputting a switching command when degradation of said packet flow is detected; and switching means for performing switching according to said output switching command between said current system and said reserved system when said detection means detects degradation of quality of said packet flow.

10. A QOS protection system as set forth in claim 9, wherein said packet delay detection portion comprises:

an up-down counter;

a first packet counter for decrementing said up-down counter at every input of packet from said current system; and a second packet counter for incrementing said up-down counter at every input of packet from said reserved system.

11. A QOS protection system as set forth in claim 9, wherein said packet variation detection portion comprises:

an up-down counter;

a first packet arriving period detecting portion rounding an expected packet arriving period and an actual packet arriving period into integers at every input of packet from said current system for integrating a difference therebetween for incrementing said up-down counter with an integrated value; and a second packet arriving period detecting portion rounding an expected packet arriving period and an actual packet arriving period into integers at every input of packet from said reserved system for integrating a difference therebetween for decrementing said up-down counter with an integrated value.

* * * * *